United States Patent
Bidram et al.

(10) Patent No.: US 10,633,190 B2
(45) Date of Patent: Apr. 28, 2020

(54) APPARATUS FOR SUPPORTING AN ARTICLE DURING TRANSPORT

(71) Applicant: ADVANCED INTELLIGENT SYSTEMS INC., Burnaby (CA)

(72) Inventors: Farhang Bidram, West Vancouver (CA); Atabak Pouya, Irvine, CA (US); Vahid Mehrabi, Coquitlam (CA); Shahram Pourazadi, Burnaby (CA); Seyed Mehdi Mirsadeghi, Coquitlam (CA)

(73) Assignee: Advanced Intelligent Systems Inc., Burnaby, British Columbia (CA)

( * ) Notice: Subject to any disclaimer, the term of this patent is extended or adjusted under 35 U.S.C. 154(b) by 0 days.

(21) Appl. No.: 16/432,755

(22) Filed: Jun. 5, 2019

(65) Prior Publication Data
US 2019/0283973 A1   Sep. 19, 2019

Related U.S. Application Data

(63) Continuation of application No. PCT/CA2019/000022, filed on Feb. 14, 2019.
(Continued)

(51) Int. Cl.
*B65G 25/08* (2006.01)
*B25J 15/00* (2006.01)
*B65G 47/22* (2006.01)

(52) U.S. Cl.
CPC ............ *B65G 25/08* (2013.01); *B25J 15/009* (2013.01); *B65G 47/22* (2013.01)

(58) Field of Classification Search
CPC .......... B65G 47/22; B65G 1/12; B65G 25/08; B67C 2/24
(Continued)

(56) References Cited

U.S. PATENT DOCUMENTS

| 4,004,677 A | 1/1977 | Heier et al. |
| 4,200,272 A * | 4/1980 | Godding ............ B23Q 1/035 269/26 |

(Continued)

FOREIGN PATENT DOCUMENTS

| CA | 2622940 A1 | 3/2007 |
| CN | 1611331 A | 5/2005 |

(Continued)

OTHER PUBLICATIONS

International Search Report issued by the Canadian Intellectual Property Office in connection with International Patent Application No. PCT/CA2019/000022, dated May 3, 2019, 3 pages.

(Continued)

*Primary Examiner* — James R Bidwell (57) ABSTRACT

An apparatus and method for supporting an article during transport is disclosed. The apparatus includes a support surface oriented to support an underside of an article to be transported. The apparatus also includes a plurality of pins distributed over at least a portion of the support surface and movable between an extended position and a retracted position, the plurality of pins being urged into the extended position such that a lateral retaining portion of each pin protrudes above the support surface. The underside of the article, when received on the support surface, causes a first portion of the plurality of pins underlying the article to be depressed into the retracted position while a second portion of the plurality of pins remain in the extended position such that the lateral retaining portions of pins disposed adjacent to the article constrain the article to prevent movement of the article on the support surface while being transported.

26 Claims, 7 Drawing Sheets

Related U.S. Application Data (60) Provisional application No. 62/804,062, filed on Feb. 11, 2019, provisional application No. 62/740,283, filed on Oct. 2, 2018, provisional application No. 62/631,116, filed on Feb. 15, 2018.

(58) Field of Classification Search
USPC .......... 198/803.14, 867.11; 269/53, 54, 54.1, 269/54.2, 54.3, 54.4, 54.5
See application file for complete search history.

(56) References Cited

U.S. PATENT DOCUMENTS

| | | | |
|---|---|---|---|
| 4,536,690 A | 8/1985 | Belsterling et al. | |
| 4,600,355 A | 7/1986 | Johnson | |
| 4,621,562 A | 11/1986 | Carr et al. | |
| 4,636,137 A | 1/1987 | Lemelson | |
| 4,678,390 A | 7/1987 | Bonneton et al. | |
| 4,698,775 A | 10/1987 | Koch et al. | |
| 4,829,840 A | 5/1989 | Torii et al. | |
| 5,017,084 A | 5/1991 | Lemelson | |
| 5,029,695 A * | 7/1991 | Kovara | B65G 29/00 141/165 |
| 5,224,586 A * | 7/1993 | Naka | B65B 43/54 156/567 |
| 5,358,568 A | 10/1994 | Okano et al. | |
| 5,491,540 A | 2/1996 | Hirst | |
| 5,503,513 A | 4/1996 | Detriche | |
| 5,523,662 A | 6/1996 | Goldenberg et al. | |
| 5,550,953 A | 8/1996 | Seraji | |
| 5,682,313 A | 10/1997 | Edlund et al. | |
| 5,737,500 A | 4/1998 | Seraji et al. | |
| 5,787,322 A | 7/1998 | Sass et al. | |
| 5,809,375 A | 9/1998 | Owens, Jr. et al. | |
| 5,887,229 A | 3/1999 | Sass et al. | |
| 5,984,293 A * | 11/1999 | Abrahamson | B23Q 1/035 269/236 |
| 6,250,619 B1 * | 6/2001 | Cook | B23Q 1/035 269/20 |
| 6,473,371 B1 | 10/2002 | White | |
| 6,507,163 B1 | 1/2003 | Allen | |
| 6,898,484 B2 | 5/2005 | Lemelson et al. | |
| 7,240,879 B1 | 7/2007 | Cepollina et al. | |
| 7,496,314 B2 | 2/2009 | Lombardo et al. | |
| 8,010,230 B2 | 8/2011 | Zini et al. | |
| 8,099,191 B2 | 1/2012 | Blanc et al. | |
| 8,160,747 B1 | 4/2012 | Blackwell et al. | |
| 8,229,595 B2 | 7/2012 | Seelinger et al. | |
| 8,229,622 B2 | 7/2012 | Payne et al. | |
| 8,360,178 B2 | 1/2013 | Goldenberg et al. | |
| 8,588,976 B2 | 11/2013 | Mangaser et al. | |
| 8,676,425 B2 | 3/2014 | Jones et al. | |
| 8,915,692 B2 | 12/2014 | Grinnell et al. | |
| 8,958,916 B2 | 2/2015 | Setrakian et al. | |
| 9,114,440 B1 | 8/2015 | Colucci et al. | |
| 9,238,304 B1 | 1/2016 | Bradski et al. | |
| 9,254,897 B2 | 2/2016 | Andrieu et al. | |
| 9,440,352 B2 | 9/2016 | Meier et al. | |
| 9,486,921 B1 | 11/2016 | Straszheim et al. | |
| 9,505,136 B1 | 11/2016 | Nusser et al. | |
| 9,751,693 B1 | 9/2017 | Battles et al. | |
| 9,770,825 B2 | 9/2017 | Goldenberg et al. | |
| 9,889,562 B1 | 2/2018 | Rembisz | |
| 9,902,560 B2 | 2/2018 | Porat | |
| 9,919,872 B2 | 3/2018 | Khodl et al. | |
| 9,952,589 B1 | 4/2018 | Brazeau | |
| 9,958,854 B2 | 5/2018 | Vasquez et al. | |
| 10,059,006 B2 | 8/2018 | Rublee | |
| 10,065,314 B2 | 9/2018 | Tian et al. | |
| 10,108,185 B1 | 10/2018 | Theobald | |
| 10,144,128 B1 | 12/2018 | Kolb et al. | |
| 10,214,400 B2 | 2/2019 | High et al. | |
| 10,336,592 B2 | 7/2019 | Atchley et al. | |
| 2004/0243280 A1 | 12/2004 | Bash et al. | |
| 2005/0222713 A1 | 10/2005 | Kawabe et al. | |
| 2008/0282494 A1 | 11/2008 | Won et al. | |
| 2009/0157224 A1 | 6/2009 | Blanc et al. | |
| 2011/0010007 A1 | 1/2011 | Sarh et al. | |
| 2011/0172850 A1 | 7/2011 | Paz-Meidan et al. | |
| 2011/0301757 A1 | 12/2011 | Jones et al. | |
| 2012/0029697 A1 | 2/2012 | Ota et al. | |
| 2013/0054024 A1 | 2/2013 | Bruemmer et al. | |
| 2013/0110281 A1 | 5/2013 | Jones et al. | |
| 2013/0181544 A1 | 7/2013 | Comins et al. | |
| 2014/0363264 A1 | 12/2014 | Gowa et al. | |
| 2015/0050111 A1 | 2/2015 | Townsend | |
| 2015/0066281 A1 | 3/2015 | Allen et al. | |
| 2015/0151933 A1 | 6/2015 | Grinnell et al. | |
| 2016/0075014 A1 | 3/2016 | Bruemmer | |
| 2016/0101940 A1 | 4/2016 | Grinnell et al. | |
| 2016/0176638 A1 | 6/2016 | Toebes | |
| 2016/0187886 A1 | 6/2016 | Jones et al. | |
| 2016/0257212 A1 | 9/2016 | Thompson et al. | |
| 2016/0259028 A1 | 9/2016 | High et al. | |
| 2016/0259341 A1 | 9/2016 | High et al. | |
| 2016/0259342 A1 | 9/2016 | High et al. | |
| 2016/0259343 A1 | 9/2016 | High et al. | |
| 2016/0259345 A1 | 9/2016 | McHale et al. | |
| 2016/0260054 A1 | 9/2016 | High et al. | |
| 2016/0260161 A1 | 9/2016 | Atchley et al. | |
| 2016/0261698 A1 | 9/2016 | Thompson et al. | |
| 2016/0318494 A1 | 11/2016 | Henry et al. | |
| 2016/0349758 A1 | 12/2016 | Wang et al. | |
| 2017/0009417 A1 | 1/2017 | High et al. | |
| 2017/0010608 A1 | 1/2017 | High et al. | |
| 2017/0010609 A1 | 1/2017 | High et al. | |
| 2017/0020354 A1 | 1/2017 | High et al. | |
| 2017/0024806 A1 | 1/2017 | High et al. | |
| 2017/0183159 A1 | 6/2017 | Weiss | |
| 2017/0248966 A1 | 8/2017 | Lutz et al. | |
| 2017/0283171 A1 | 10/2017 | High et al. | |
| 2017/0349376 A1 | 12/2017 | Porat | |
| 2018/0001479 A1 | 1/2018 | Li et al. | |
| 2018/0127999 A1 | 5/2018 | Durvasula et al. | |
| 2018/0162469 A1 | 6/2018 | Blankespoor et al. | |
| 2018/0281143 A1 | 10/2018 | Albert et al. | |
| 2018/0349843 A1 | 12/2018 | High et al. | |
| 2018/0354143 A1 | 12/2018 | Dorfman | |
| 2018/0361571 A1 | 12/2018 | Georgeson et al. | |

FOREIGN PATENT DOCUMENTS

| | | |
|---|---|---|
| CN | 104133472 A | 11/2014 |
| CN | 205219095 | 5/2016 |
| CN | 105729441 A | 7/2016 |
| CN | 106002932 A | 10/2016 |
| CN | 106272415 A | 1/2017 |
| CN | 107753105 A | 3/2018 |
| CN | 108335458 A | 7/2018 |
| DE | 3416435 A1 | 11/1985 |
| DE | 102015220066 A1 | 4/2017 |
| DE | 102016009548 B3 | 8/2017 |
| DE | 102016222255 B3 | 4/2018 |
| DE | 102017009939 A | 4/2019 |
| EP | 0304342 A2 | 2/1989 |
| EP | 0388288 A1 | 9/1990 |
| EP | 0441397 A1 | 8/1991 |
| EP | 0616275 B1 | 9/1998 |
| EP | 2147757 A1 | 1/2010 |
| EP | 2296071 A1 | 3/2011 |
| EP | 2631040 A2 | 8/2013 |
| EP | 2546711 B1 | 5/2018 |
| EP | 3415284 A2 | 12/2018 |
| EP | 3418245 A1 | 12/2018 |
| FR | 2492784 | 4/1982 |
| JP | S6449237 A | 2/1989 |
| JP | H04310382 A | 11/1992 |
| JP | H05201547 A | 8/1993 |
| JP | 3188953 B2 | 7/2001 |
| JP | 2009196381 | 9/2009 |
| JP | 5900462 B2 | 4/2016 |
| JP | 6531968 B2 | 6/2019 |
| KR | 20070011495 A | 1/2007 |
| KR | 101059929 B1 | 8/2011 |

(56) References Cited

FOREIGN PATENT DOCUMENTS

| WO | 2004103864 A1 | 7/2006 |
| WO | 2013066534 A1 | 5/2013 |
| WO | 2015038705 A1 | 3/2015 |
| WO | 2017197305 A1 | 11/2017 |
| WO | 2018045448 A1 | 3/2018 |
| WO | 2018114041 A1 | 6/2018 |
| WO | 2018140471 A1 | 8/2018 |
| WO | 2018162491 A1 | 9/2018 |
| WO | 2018170102 A1 | 9/2018 |
| WO | 2018205198 A1 | 11/2018 |
| WO | 2018213164 A1 | 11/2018 |
| WO | 2018213931 A1 | 11/2018 |
| WO | 2019028226 A1 | 2/2019 |
| WO | 2019055281 A1 | 3/2019 |

OTHER PUBLICATIONS

Written Opinion of the International Searching Authority issued by the Canadian Intellectual Property Office in connection with International Patent Application No. PCT/CA2019/000022, dated May 3, 2019, 4 pages.
International Search Report and Written Opinion of the International Searching Authority issued by the Canadian Intellectual Property Office in connection with International Patent Application No. PCT/CA2017/000057, dated Jul. 25, 2017, 14 pages.
International Search Report and Written Opinion of the International Searching Authority issued by the Canadian Intellectual Property Office in connection with International Patent Application No. PCT/CA2019/050311, dated May 24, 2019, 12 pages.
Kielhofer, Simon, European Patent Office, Extended European Search Report, in connection with related European Patent Application No. 17847836, dated Aug. 20, 2019, 8 pages.

\* cited by examiner

APPARATUS FOR SUPPORTING AN ARTICLE DURING TRANSPORT

RELATED APPLICATIONS

This application claims the benefit of provisional patent application 62/631,116 entitled "WORK TABLE FOR A MOBILE ROBOT", filed on Feb. 15, 2018 and incorporated herein by reference in its entirety. This application also claims the benefit of provisional patent application 62/740,283 entitled "WORK TABLE FOR A MOBILE ROBOT BASED ON AN ELASTIC MEMBRANE", filed on Oct. 2, 2018 and incorporated herein by reference in its entirety. This application also claims the benefit of provisional patent application 62/804,062 entitled "TRANSPORT APPARATUS WITH SENSORS", filed on Feb. 11, 2019 and incorporated herein by reference in its entirety.

BACKGROUND

1. Field

This disclosure relates generally to supporting articles for transport and more particularly to laterally supporting articles on a support surface during transport.

2. Description of Related Art

Movable support surfaces that receive articles for transport may be used in vehicles, conveyors, and other applications. For example, robotic vehicles may be configured to autonomously or semi-autonomously transport articles in a variety of applications and potentially decrease the cost and time required to complete otherwise inefficient operations. Such robotic vehicles may be used in warehousing or plant nursery applications for transporting articles around a workspace.

SUMMARY

In accordance with one disclosed aspect there is provided an apparatus for supporting an article during transport. The apparatus includes a support surface oriented to support an underside of an article to be transported. The apparatus also includes a plurality of pins distributed over at least a portion of the support surface and movable between an extended position and a retracted position, the plurality of pins being urged into the extended position such that a lateral retaining portion of each pin protrudes above the support surface. The underside of the article, when received on the support surface, causes a first portion of the plurality of pins underlying the article to be depressed into the retracted position while a second portion of the plurality of pins remain in the extended position such that the lateral retaining portions of pins disposed adjacent to the article constrain the article to prevent movement of the article on the support surface while being transported.

Each of the plurality of pins may have a generally cylindrical shape and may be slidingly received within an opening in the support surface.

Each pin may have a distal end disposed below the support surface, the distal end having a flange for engaging an underside of the support surface and retaining the pin within the opening when in the extended position.

The apparatus may include a compliant membrane disposed below the support surface and the distal end of each pin, when retracted may cause elastic deformation of the membrane, the elastic deformation being operable to urge the pin toward the extended position.

The membrane may be mounted in a transversely deformed condition to provide a pre-load force for urging the plurality of pins toward the extended position.

A portion of the distal end of the pin may have one of a rounded shape, a conical shape, and a flat shape.

The support surface may be partitioned into a plurality of modular pin assemblies adjacently arranged to provide the support surface, each pin assembly including a support plate having openings for receiving a subset of the plurality of pins, a spacer frame operably configured to provide space for movement of the subset of the plurality of pins between the extended position and the retracted position, a compliant membrane between the support plate and the spacer frame and below the respective distal ends of the subset of the plurality of pins, and where the distal end of each pin causes elastic deformation of the membrane, the elastic deformation being operable to urge the pin toward the extended position.

The modular pin assemblies may be attached to a base.

Each pin assembly may include a retaining magnet operably configured to secure the pin assembly to the base.

The modular pin assemblies may have a one of a circular shape and a regular polygonal shape.

The apparatus may include a cylindrical insert disposed in each opening in the support surface and having a distal end extending below the support surface, the cylindrical insert including a bore for slidingly receiving the pin, and a resilient element disposed between the distal end of the insert and the pin, the resilient element being operable to urge the pin toward the extended position.

The resilient element may include one of a spring, a compliant material, an elastomer, and a compressible fluid.

When the pin is in the retraced position the resilient element may be operably configured to exert a force on each pin such that a total force exerted by the pins underlying the article is less than a weight of the article being supported.

The plurality of pins may be regularly distributed over a portion of the support surface intended to support the article.

The support surface may be sized to support a plurality of articles spaced apart on the support surface, each article in the plurality of articles having a portion of the plurality of pins underlying the article depressed into the retracted position and a portion of the plurality of pins remaining in the extended position such that the lateral retaining portions of pins disposed adjacent to the each article constrain the plurality of articles on the support surface.

The support surface may be mounted on a robotic vehicle operable to transport the at least one article.

The apparatus may include a manipulator operably configured to load the plurality of articles onto the support surface.

The support surface may be rotatably mounted on the vehicle and may further include at least one actuator operably configured to cause successive relative rotational movements between the manipulator and the support surface to provide access for loading subsequent articles in the plurality of articles onto the support surface.

The plurality of articles may include a plurality of plant pots and the apparatus may be used to transport the plant pots within a plant nursery.

The apparatus may include a controller operable to control loading of articles onto the support surface at a pickup location within the plant nursery, control movement of the vehicle for navigating within the plant nursery, and to control unloading of articles from the support surface at a drop-off location within the plant nursery.

The support surface may include a conveyor belt coupled to a conveyor drive, the conveyor drive being operable to cause movement of the conveyor belt to transport a plurality of articles.

The apparatus may include a plurality of sensors, each sensor being associated with at least one pin in the plurality of pins and operably configured to generate a signal in response to the at least one pin moving between the extended and retracted positions.

Each sensor may be associated with a subset of adjacently located pins in the plurality of pins and the signal may be generated by the sensor in response to movement of any of the pins in the subset of pins.

The apparatus may include a controller operably configured to process the signals from the plurality of sensors to determine at least one of a presence of the article received on the support surface, a location of the article received on the support surface, a weight of the article received on the support surface, and an orientation of the article received on the support surface.

The sensor may include one of an electrical contact disposed to be contacted by a conductive portion associated with movement of the pin between the extended position and the retracted position, and a force sensing element operably configured to generate the signal in response to a force being applied by the pin moving between the extended and retracted positions.

Each sensor in the plurality of sensors may be connected via a circuit layer underlying the support surface to a controller, the controller being operably configured to process the respective signals.

The controller may include a processor circuit operable to process the signals and an interface operably configured to transmit data representing the processed signals to a host controller.

In accordance with another disclosed aspect there is provided a method for transporting an article. The method involves supporting an underside of an article to be transported on a support surface. The method also involves causing a plurality of pins distributed over at least a portion of the support surface and movable between an extended position and a retracted position to be urged into the extended position such that a lateral retaining portion of each pin protrudes above the support surface. The method further involves receiving the article on the support surface, the underside of the article causing a first portion of the plurality of pins underlying the article to be depressed into the retracted position while a second portion of the plurality of pins remain in the extended position such that the lateral retaining portions of pins disposed adjacent to the article constrain the article to prevent movement of the article on the support surface while being transported.

Other aspects and features will become apparent to those ordinarily skilled in the art upon review of the following description of specific disclosed embodiments in conjunction with the accompanying figures.

BRIEF DESCRIPTION OF THE DRAWINGS

In drawings which illustrate disclosed embodiments.

DETAILED DESCRIPTION

Figure 1:
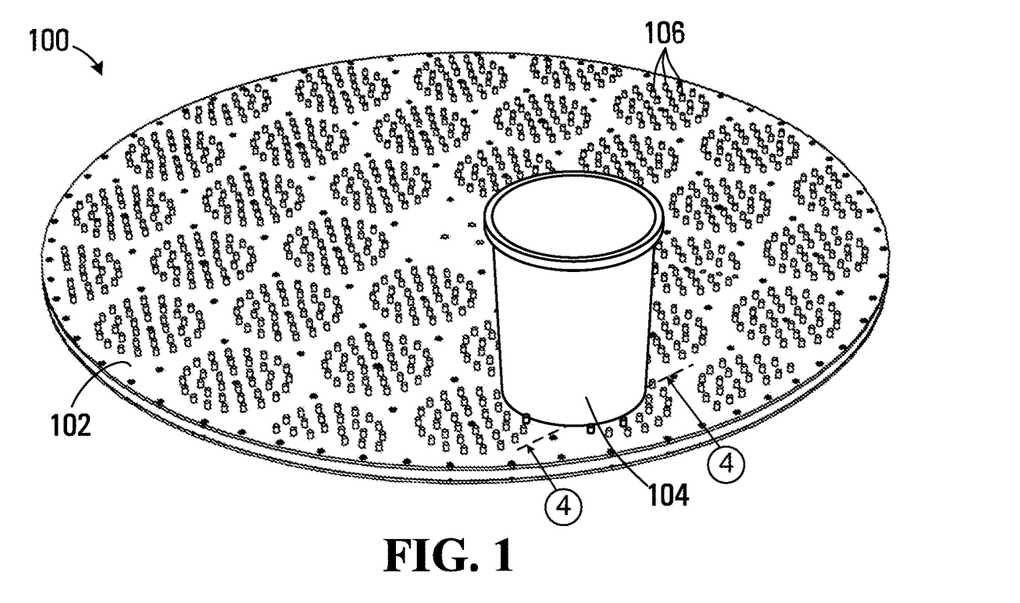
FIG. 1 is a perspective view of an apparatus for supporting an article during transport.

Referring to FIG. 1, an embodiment of an apparatus for supporting an article during transport is shown generally at 100. The apparatus 100 includes a support surface 102 oriented to support an underside of an article 104 to be transported. The apparatus 100 includes a plurality of pins 106 distributed over at least a portion of the support surface 102.

Figure 2:
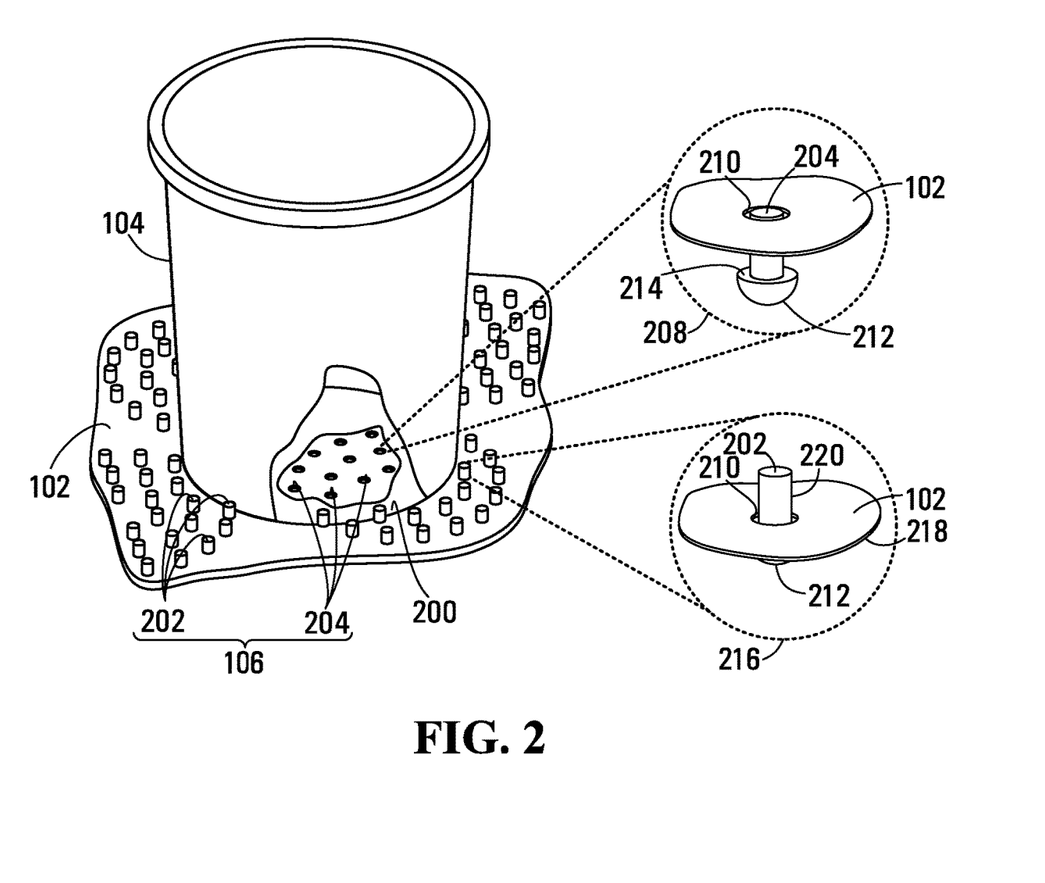
FIG. 2 is a perspective view of a portion of a support surface of the apparatus for supporting an article shown in FIG. 1.

Referring to FIG. 2, a portion of the support surface 102 is shown with the article 104 cut away to reveal the underside 200 of the article. The underside 200 is also cut away to reveal the pins 106 on the support surface 102 underlying the article. The pins 106 are movable between an extended position and a retracted position. In FIG. 2, the pins 202 on the support surface 102 adjacent to the article are in the extended position while the pins 204 underlying the article are in the retracted position.

A retracted pin 204 is shown enlarged in a drawing insert 208. The pin 204 is slidingly received within an opening 210 in the support surface 102 and has a distal end 212 disposed below the support surface 102. In this embodiment the distal end 212 comprises a rounded head having an upwardly directed flange 214.

An extended pin 202 is shown in the insert 216, where the flange 214 (shown in the insert 208) has engaged an underside 218 of the support surface 102 and a generally cylindrical lateral retaining portion 220 of the pin extends through the opening 210 above the support surface 102. The opening 210 is sized to guide movement of the pin 106 within the opening 210. In one embodiment the opening 210 is sized for a sliding fit of the pin 106, which permits free movement while reducing friction between the pin and sides of the opening.

Figure 3:
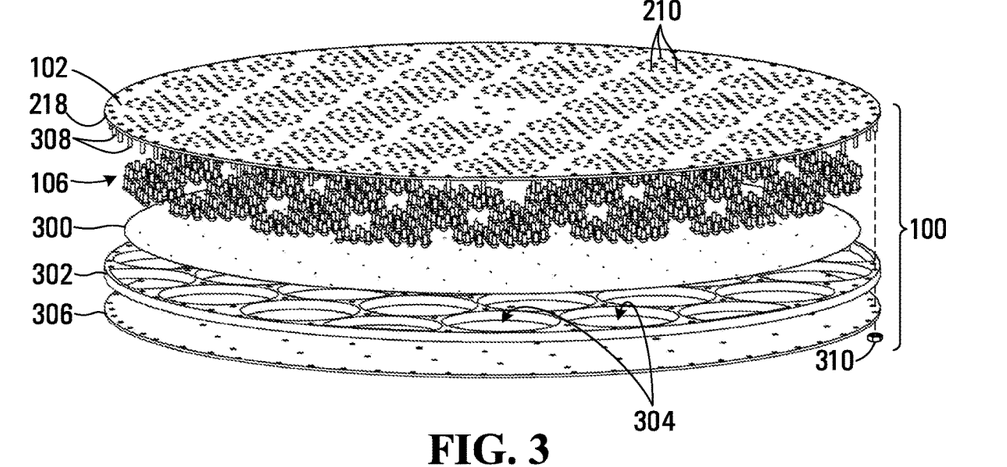
FIG. 3 is an exploded view of the apparatus shown in FIG. 1.

The apparatus 100 is shown in exploded view in FIG. 3. Referring to FIG. 3, the support surface 102 has a plurality of the openings 210 for receiving the plurality of pins 106, which in this embodiment are distributed across the support surface 102 in generally circular groups. In other embodiments the openings 210 may be regularly spaced or arranged in other patterns to suit the article or articles being transported. The apparatus 100 further includes a compliant membrane 300 disposed below the support surface 102. The apparatus 100 also includes a spacer frame 302 having a plurality of generally cylindrical cavities 304 extending through the spacer frame and aligned with corresponding circular groups of the openings 210 on the support surface 102. The apparatus 100 further includes a lower cover 306 that encloses the underside of the spacer frame 302.

A plurality of fasteners 308 extend through the support surface 102, the compliant membrane 300, the spacer frame 302, and the lower cover 306. Some of the plurality of fasteners 308 are distributed around a peripheral edge of the support surface 102, while others are disposed inwardly from the peripheral edge. In this embodiment each fastener 308 has a threaded end that receives a nut 310 for holding the elements of the apparatus 100 together such that the membrane 300 is sandwiched between the underside 218 of the support surface 102 and the spacer frame 302.

In the embodiment shown in FIG. 3, the compliant membrane 300 is sized to be slightly smaller than the support surface 102 and spacer frame 302. During assembly of the apparatus 100, the support surface 102 may be supported facing downward and the pins 106 inserted through the openings 210. The compliant membrane 300 may then be stretched over the plurality of fasteners 308 at the peripheral edge of the support surface 102 such that the membrane is transversely deformed in the plane of the membrane. The spacer frame 302 may then be aligned to the fasteners 308 and lowered to engage the compliant membrane 300. Finally the lower cover 306 may be aligned to the fasteners 308 and lowered to engage the underside of the spacer frame 302.

Figure 4:
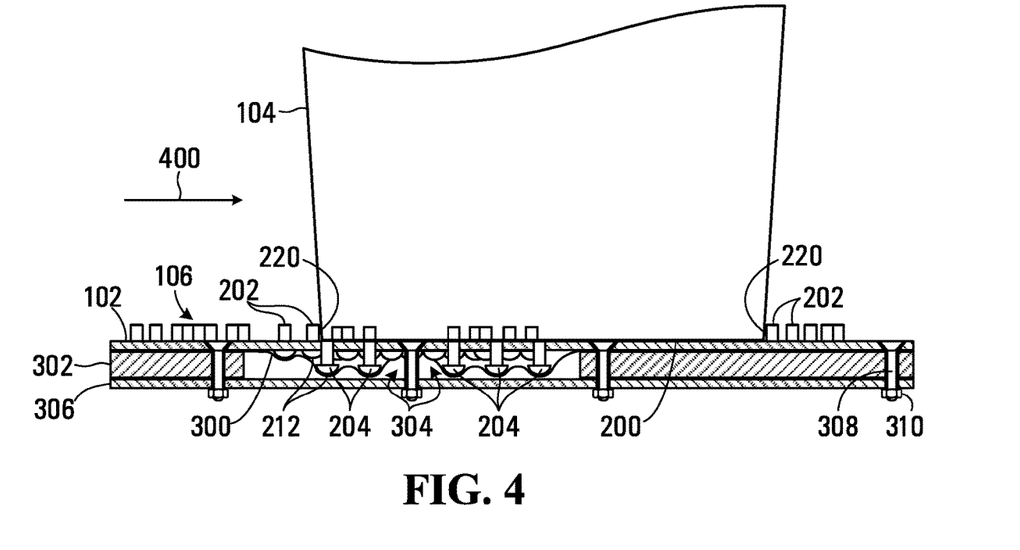
FIG. 4 is a cross-sectional view of a portion of the apparatus shown in FIG. 1 taken along the line 4-4.

A portion of the apparatus 100 is shown in cross section in FIG. 4 with the article 104 (shown in part) supported on the support surface 102. The distal ends 212 of the pins 202 cause some local elastic deformation of the membrane 300, which is sufficient to retain the pins in the extended position. In embodiments where the compliant membrane 300 is mounted in a transversely deformed condition, the membrane provides a pre-load force sufficient to urge the plurality of pins 106 toward the extended position. Two adjacent cylindrical cavities 304 in the spacer frame 302 provide space for the pins 204 to be depressed downwardly by the underside 200 of the article 104 into the retracted position. When the pins 204 are depressed into the retraced position, additional deformation of the compliant membrane 300 exerts an additional force on the each pin. When the article 104 is subsequently removed, the force is sufficient to return the pin to the extended position. In one embodiment the compliance and transverse deformation of the compliant membrane 300 is selected such that a total force exerted by the pins underlying the article 104 is less than a typical weight of the article 104 being supported. The compliant membrane 300 generally elastically deforms within each of the cylindrical cavities 304 to conform to the distal ends 212 of the extended pins 202 and retracted pins 204.

Pins 202 that are adjacent to the article 104 and are thus not engaged by the underside 200 of the article 104 remain in the extended position such that the lateral retaining portion 220 protrudes above the support surface 102. The lateral retaining portions 220 of the pins 202 disposed adjacent to the article 104 constrain the article to prevent movement of the article on the support surface 102 during movement of the apparatus 100. For example, should the apparatus 100 be accelerated in the direction of the arrow 400, the article 104 may tend to slide on the support surface 102 in an opposite direction. The lateral retaining portion 220 of the extended pin 202 on the left hand side of the article 104 would prevent this undesirable movement of the article. Advantageously, the retaining function of the pins 106 does not involve any action other than loading the article on the support surface 102. Additionally, the article 104 may be loaded at any location on the support surface 102 that is covered by the pins 106, and a plurality of extended pins 202 surrounding the article will remain extended and laterally retain the article from all sides.

Figure 5:
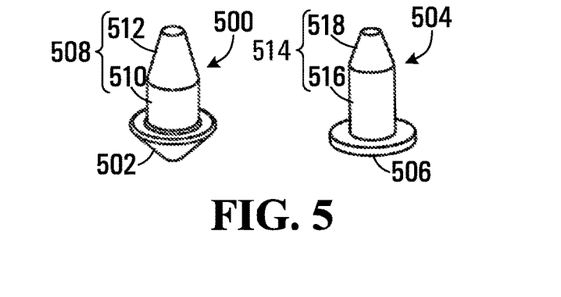
FIG. 5 is a perspective view of a pair of alternative embodiments of a pin used on the support surface of the apparatus shown in FIG. 1.

In the embodiment shown in FIGS. 2 to 4, the pins 106 have a flat distal end 212 and a cylindrical lateral retaining portion 220. Referring to FIG. 5, in another embodiment a pin 500 may have a generally conical or truncated conical shaped distal end, as shown at 502. Alternatively, a pin 504 may have a flat distal end such as shown at 506. Additionally a lateral retaining portion 508 of the pin 500 may include a generally cylindrical portion 510 and a truncated conical portion 512. Similarly a lateral retaining portion 514 of the pin 504 may include a generally cylindrical portion 516 and a truncated conical portion 518. In some embodiments if the article 104 is loaded onto the support surface 102 such that an edge of the article laterally engages the truncated conical portion 512, 518 of the pins 508 and 514, the truncated conical portions will cause a component of force to be directed vertically downward causing the pin to be depressed. For an extended pin 202 having only a cylindrical portion as shown in FIG. 4, in cases where the loading of the article 104 does not prevent lateral engagement of the cylindrical portion of the pin, the pin will not be depressed and may cause the article to tip. In other embodiments the pins 106 may have a rounded or spherical ends.

Figure 6:
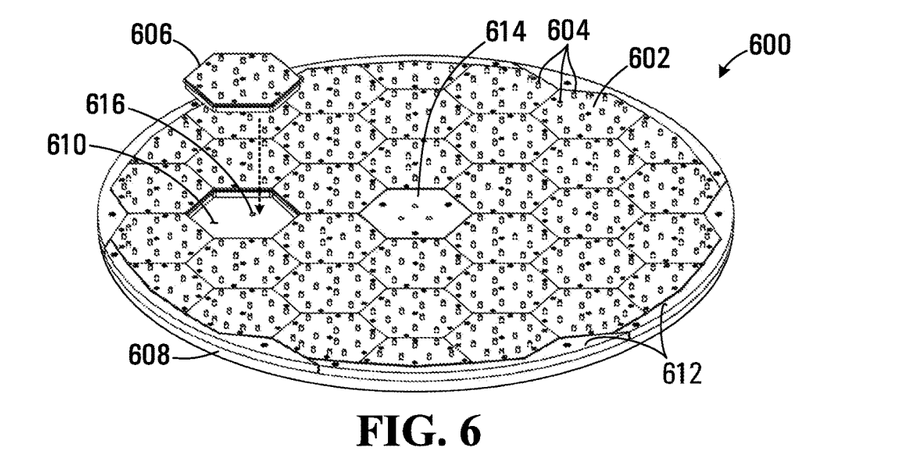
FIG. 6 is a perspective view of an apparatus for supporting an article during transport in accordance with another disclosed embodiment.

An apparatus in accordance with another disclosed embodiment is shown at 600 in FIG. 6. The apparatus 600 includes a support surface 602, having a plurality of pins 604 partitioned into a plurality of modular pin assemblies 606. The plurality of modular pin assemblies 606 are adjacently arranged to cover at least the portion of the support surface 602. In the embodiment shown the apparatus 600 includes a base 608 having an upwardly oriented flat surface 610 on which the pin assemblies 606 are received and supported. In the embodiment shown the apparatus 600 also includes a wall 612 enclosing a periphery of the flat surface 610. The wall 612 laterally retains the pin assemblies 606 on the base 608.

Figures 7A, 7B:
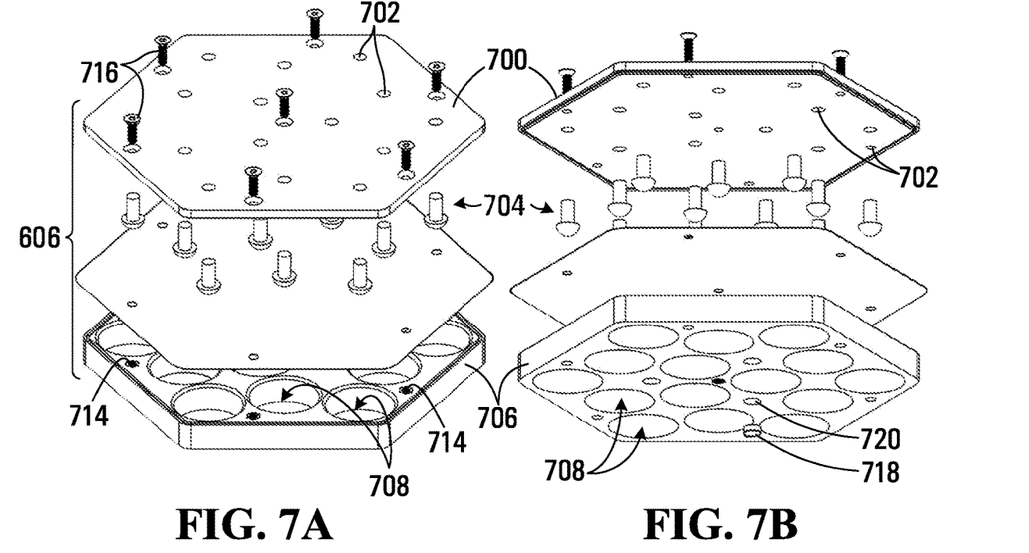
FIG. 7A is an exploded view of a modular pin assembly of the apparatus shown in FIG. 6.
FIG. 7B is another exploded view of the modular pin assembly of the apparatus shown in FIG. 6.

The pin assembly 606 is shown in exploded view in FIGS. 7A and 7B from differing perspective viewpoints. Referring to FIGS. 7A and 7B, each pin assembly 606 includes a support plate 700 having openings 702 for receiving a subset 704 of the plurality of pins 604. The modular pin assembly 606 also includes a spacer frame 706 operably configured to provide space for movement of the pins 704 between the extended position and the retracted position. In this embodiment the spacer frame 706 has a plurality of cylindrical cavities 708, each cavity being associated with a respective one of the pins 704. The pin assembly 606 also includes a compliant membrane 710 disposed between the support plate 700 and the spacer frame 706 and below respective distal ends 712 of the pins 704. The spacer frame 706 includes a plurality of threaded openings 714 for receiving respective threaded fasteners 716. The threaded fasteners 716 extend through the support plate 700, the compliant membrane 710, and into the threaded openings 714 in the spacer frame 706 to hold the apparatus 600 together.

Figure 8A:
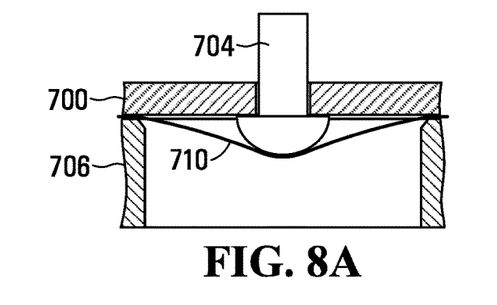
FIG. 8A is a cross-sectional view of a portion of the pin assembly shown in FIG. 7 in an extended position.
Figure 8B:
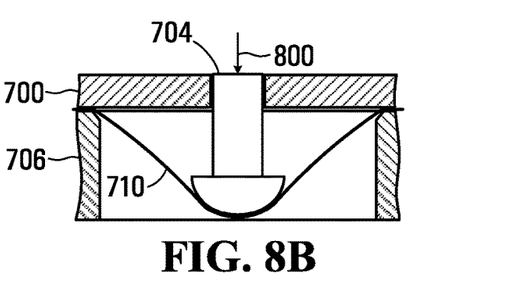
FIG. 8B is a cross-sectional view of a portion of the pin assembly shown in FIG. 7 in a retracted position.

A single pin 704 and portion of the pin assembly 606 in the extended position is shown in cross-section in FIG. 8A, where a local portion of the compliant membrane 710 sandwiched between the spacer frame 706 and the support plate 700 retains the pin 704 in the extended position. The compliant membrane 710 may be mounted in a transversely deformed condition as described above for the apparatus 100 to provide a pre-load force for urging the pin 704 toward the extended position. A single pin 704 in the retracted position and portion of the pin assembly 606 is shown in cross-section in FIG. 8B, where a local portion of the compliant membrane 710 has been further deformed by a downward force 800 acting on the pin 704.

Referring back to FIG. 7B, in the embodiment shown the pin assembly 606 also includes a magnet 718 that is secured within a recess 720 in the spacer frame 706. Referring back to FIG. 6, the base 608 has a corresponding magnet 616 recessed in the flat surface 610. When the modular pin assembly 606 is received on the flat surface 610 of the base 608, the magnets 718 and 616 align and provide a retaining force that secures the pin assembly to the surface of the base. In other embodiments, one of the flat surface 610 and the spacer frame 706 may be a ferromagnetic material allowing one of the magnets 718 and 616 to be omitted.

In the embodiment shown the modular pin assemblies 606 have a hexagonal shape and are tiled across the support surface 602 to provide the plurality of pins 604. In other embodiments the modular pin assemblies 606 may have a regular polygonal shape such as a triangle, square, pentagon or other multi-sided shape, or a circular shape, for example.

In the embodiment shown in FIG. 6, a central portion 614 of the support surface 602 of the apparatus 600 is does not include pins 604 and is not configured as a modular pin assembly 606. Rather the central portion 614 has mounting features for mounting the apparatus 600 to a transport structure (not shown). Similarly, for other portions of the support surface 602 that will not be expected to receive an article, the modular pin assembly 606 may be omitted.

The modular pin assemblies 606 may be easily removed for cleaning, maintenance, or replacement. The modular pin assemblies 606 also permit the support surface 602 to be selectively configured with modules having differing pin spacing or differing retaining length for accommodating different sized or shaped articles. The embodiment shown in FIGS. 7A and 7B where the modular pin assembly 606 has a cylindrical cavity 708 for each respective pin 704 provides a generally consistent compliance for movement of each separate pin within the module.

Figure 9:
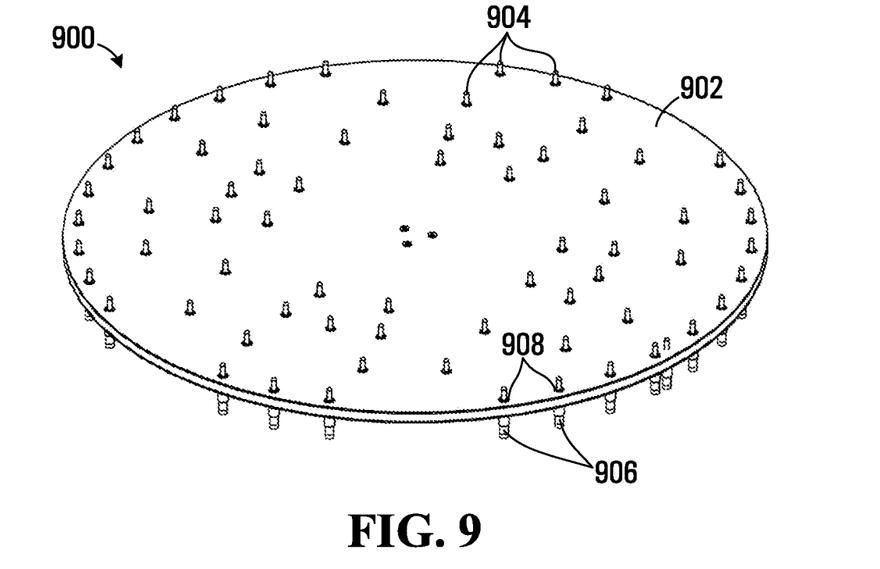
FIG. 9 is a perspective view of an apparatus for supporting an article during transport in accordance with another disclosed embodiment.
Figure 10:
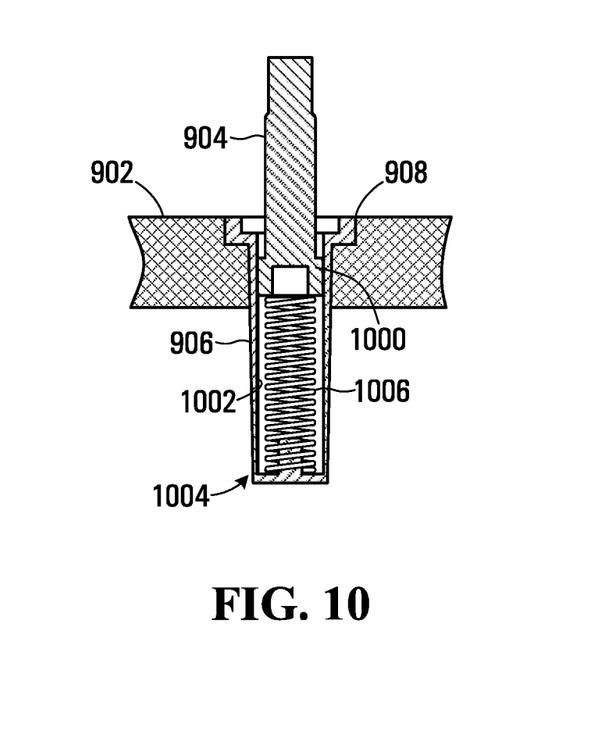
FIG. 10 is a cross sectional view of a cylindrical insert and pin of the apparatus shown in FIG. 9.

An apparatus in accordance with another disclosed embodiment is shown at 900 in FIG. 9. The apparatus 900 includes a support surface 902, having a plurality of pins 904 distributed over at least a portion of the support surface. Each of the pins 904 comprises a generally cylindrical insert 906 disposed in respective openings 908 in the support surface 902. Referring to FIG. 10, a cylindrical insert 906 is shown in cross section along with a portion of the support surface 902. The insert 906 is received within the opening 908 in the support surface 902. In one embodiment the opening 908 may be sized to provide an interference fit for the cylindrical insert 906, such that the inserts can be press fitted into the support surface 902. The pin 904 has a distal end 1000 extending below the support surface 902. The cylindrical insert 906 has a bore 1002 for slidingly receiving the distal end 1000 of the pin 904. The bore 1002 is sized to permit the distal end 1000 of the pin 904 to move freely within the bore without substantial friction. The cylindrical insert 906 also includes a resilient element 1006 disposed between a distal end 1004 of the insert 906 and the pin 904. The resilient element 1006 is operable to urge the pin 904 toward the extended position.

In the embodiment shown the resilient element 1006 comprises a helical spring. In other embodiments the resilient element 1006 may be implemented using another compliant material such as an elastomeric plug. Alternatively, the resilient element 1006 may be implemented as a compressible fluid retained within a sealed bore 1002 of the cylindrical insert 906 that is resiliently compressed when the pin 904 is depressed. The resilient element 1006 is operably configured to exert a force on the pin 904 in the retraced position, such that a total force exerted by pins underlying the article is less than a weight of the article being supported.

Figure 11:
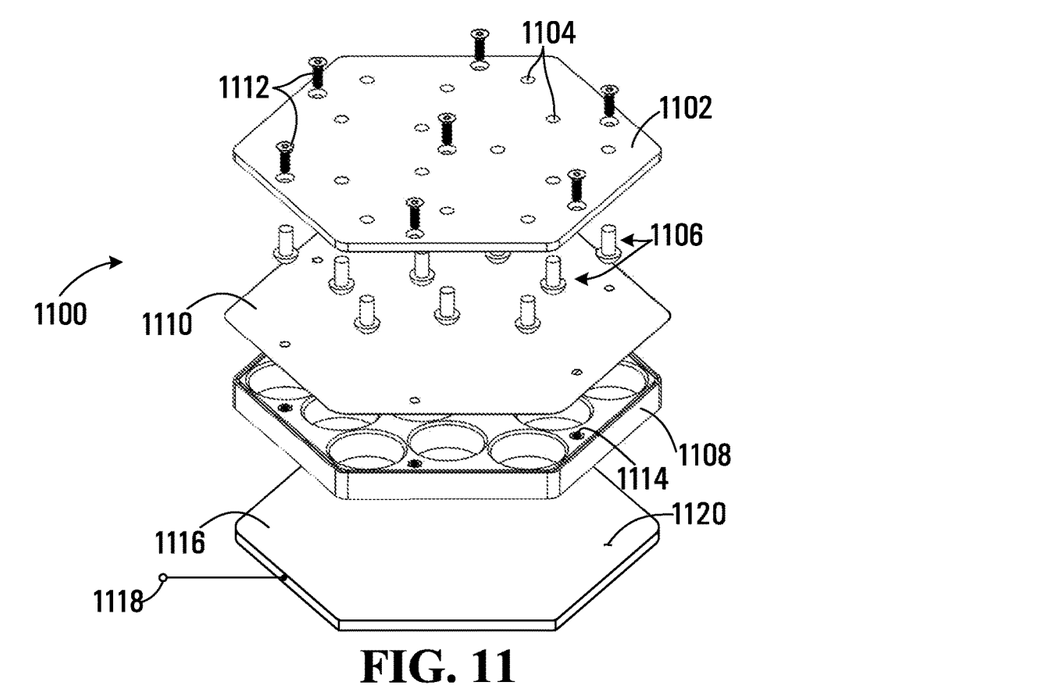
FIG. 11 is an exploded view of a modular pin assembly in accordance with another embodiment.

An alternative embodiment of the pin assembly 606 shown in FIGS. 7A and 7B is shown in FIG. 9 at 1100. The pin assembly 1100 is generally configured as described above in connection with the plurality of modular pin assemblies 606 and includes a support plate 1102 having openings 1104 for receiving a plurality of pins 1106. The pin assembly 1100 also includes a spacer frame 1108 operably configured to provide space for movement of the pins 1106 between the extended position and the retracted position. The pin assembly 1100 also includes a compliant membrane 1110 disposed between the support plate 1102 and the spacer frame 1108 and below the distal ends of the pins 1106. Threaded fasteners 1112 extend through the support plate 1102, the compliant membrane 1110, and into threaded openings 1114 in the spacer frame 1108 to hold the apparatus 1100 together.

In this embodiment the pin assembly 1100 further includes a sensor 1116 disposed below the spacer frame 1108 and operable produce a signal at an output 1118 in response to movement of the pins 1106. In one embodiment a signal is produced at the output 1118 when one or more of the pins 1106 move from the extended position into the retracted position. The sensor 1116 may be implemented using force-sensitive resistors, force-sensitive capacitors, a switch, or other sensor capable of producing a signal responsive to the state of the pins 1106. In this embodiment the sensor 1116 is implemented as a single sensor associated with the modular pin assembly 1100 and as such would be responsive to produce a signal if one or more of the pins 1106 is depressed into the retracted position. In other embodiments described herein, each individual pin may have an associated sensor. When the sensor 1116 is implemented as a force-sensitive sensor, the signal produced at the output 1118 may be in proportion to a force experienced over a surface 1120 of the sensor 1116 and would thus be dependent on the number of pins that are depressed into the retracted position.

Figure 12:
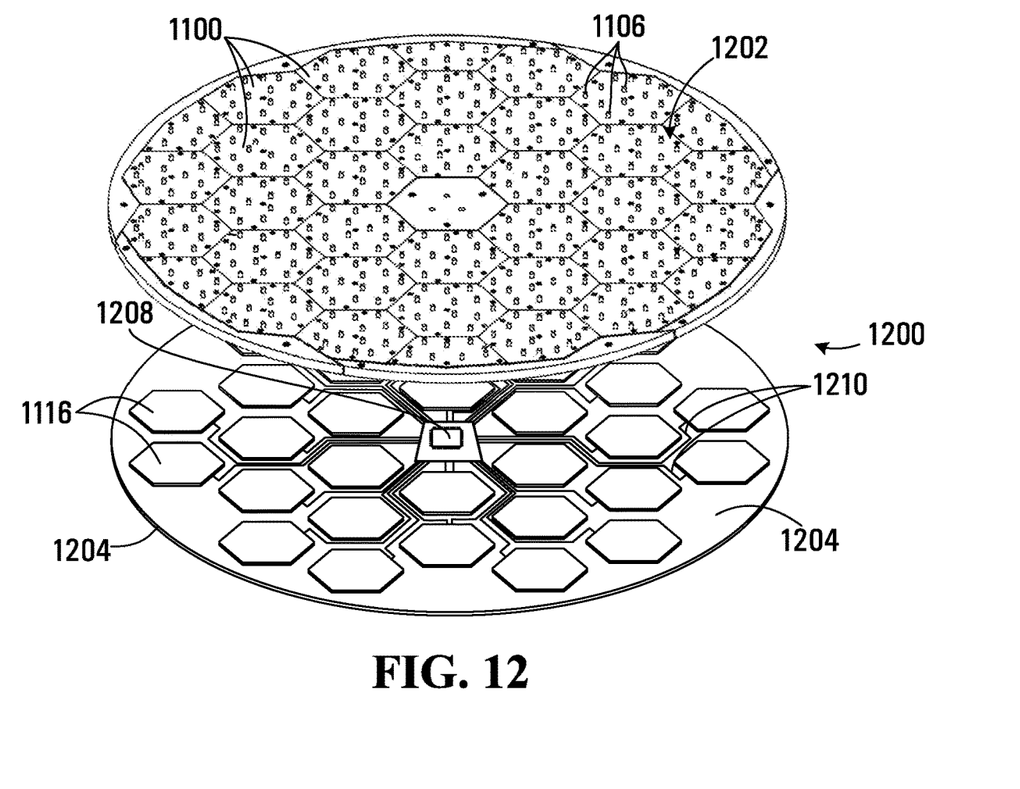
FIG. 12 is an exploded perspective view of an apparatus for supporting an article during transport in accordance with another disclosed embodiment.

An apparatus for supporting an article during transport in accordance with another disclosed embodiment is shown at 1200 in FIG. 12. The apparatus 1200 is generally configured as described above in connection with FIG. 6 and includes a plurality of the modular pin assemblies 1100 having pins

1106. The plurality of modular pin assemblies 1100 are adjacently arranged to provide the support surface 1202. The apparatus 1200 further includes a sensor assembly 1204 having a plurality of the sensors 1116 mounted on a base 1206. The sensor assembly 1204 is shown separated from the support surface 1202 in FIG. 12 for purposes of revealing elements of the sensor assembly 1204, but in use the support surface 1202 would overlie the base 1206 such that the pins 1106 are able to interact with the sensors 1116. Each of the plurality of sensors 1116 is positioned on the base 1206 such that when the support surface 1202 is placed in contact with the base 1206, the pin assemblies 1100 are positioned above the respective sensors as shown in the exploded view of FIG. 11.

The sensor assembly 1204 further includes a controller 1208, which receives signals via electrical conductors 1210 running between the respective outputs 1118 of the plurality of sensors 1116 and the processor circuit. In one embodiment the controller 1208 is implemented as an embedded processor circuit. The processor circuit of the controller 1208 receives and processes the signals from the sensors 1116 to generate information regarding the state of the pins 1106 and then transmits the data via an interface (not shown) to a host controller. In one embodiment the interface is implemented as a wireless interface, such as an IEEE 802.11 Wi-Fi interface and transmits the data wirelessly to the host controller.

When an article such as the article 104 is placed on the support surface 1202, the article causes the pins 1106 below the article to be depressed. In some embodiments the sensors 1116 are implemented as switches that produce a signal at the respective outputs 1118 when one or more pins are depressed into the retracted position. As an example, the compliant membrane 1110 shown in FIG. 11 may have an underside surface coated with a conductive material and each sensor 1116 may be implemented as a conductive plate. When a pin 1106 is depressed, the compliant membrane 1110 is elastically deformed to make contact with the sensor 1116, thus closing the switch. The sensor 1116 thus produces a signal in response to an article being placed on the support surface 1202. The controller 1208 may be configured to read the signals from the sensors 1116 to at least approximately locate the article on the support surface 1202. Subsequently, if the article shifts or is moved, the signals produced by the sensors 1116 will change as some pins 1106 that were previously depressed into the retracted state return to the extended state. The change in signal may thus be processed by the controller 1208 to produce article location and/or movement data.

In other embodiments where the sensors 1116 are implemented as force-sensitive elements a force exerted by a pin 1106 by deformation of the compliant membrane 1110 causes a force to be exerted on the sensor 1116 producing an electronic signal in proportion to the force. The electrical signals produced by sensors underlying the article may be processed by the controller 1208 to determine an approximate position and also the weight of the article. Each sensor 1116 effectively produces a signal proportional to the combined force experienced by the sensor. If the article completely covers one of the pin assemblies 1100, the signal would indicate a larger force than a partially covered assembly. The location of the article may thus be determined by processing the different signals produced by the sensors 1116 while the weight may be determined by summing the signals to determine a total force. For a subsequent article placed on the support surface 1202, changes in the signals would be indicative of the location and weight of the subsequent article. A signal calibration factor for determining the weight of the article may be determined by placing known weights on the support surface 1202.

Figure 13A:
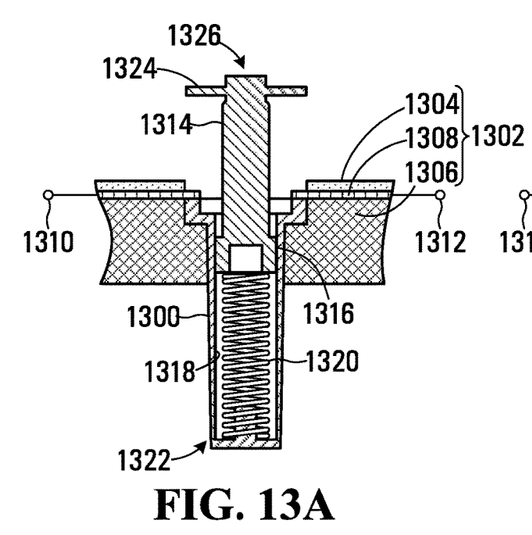
FIG. 13A is a cross-sectional view of an alternative embodiment of a pin assembly in an extended position.

In other embodiments, a plurality of sensors may be implemented to provide the status and or force for each pin 1106 on the support surface 1202. The pin inserts 906 in the apparatus 900 shown in FIGS. 9 and 10 may be replaced with the cylindrical insert 1300 shown in FIGS. 13A and 13B. Referring to FIG. 13A, the cylindrical insert 1300 is shown in cross section in along with a portion of an associated support surface 1302. The support surface 1302 includes an upper layer 1304 of an insulating material such as rubber, and a structural support layer 1306. A conductive circuit layer 1308 is sandwiched in between the upper layer 1304 and the structural support layer 1306. In the embodiment shown, a first portion of the conductive circuit layer 1308 is connected to a terminal 1310 and a second portion of the conductive circuit layer 1308 is connected to a terminal 1312. The cylindrical insert 1300 includes a pin 1314 having a distal end 1316 extending below the support surface 1302. The cylindrical insert 1300 is either fabricated from an insulating material or is insulated from the conductive circuit layer 1308 and has a bore 1318 for slidingly receiving the distal end 1316 of the pin 1314. The bore 1318 is sized to permit the distal end 1316 of the pin 1314 to move freely within the bore without substantial friction. The cylindrical insert 1300 also includes a spring 1320 disposed between a distal end 1322 of the insert 1300 and the pin 1314, which is operable to urge the pin 1314 toward the extended position as shown in FIG. 13A. The pin 1314 includes a conductive flange 1324 which is located proximate a tip 1326 of the pin.

Figure 13B:
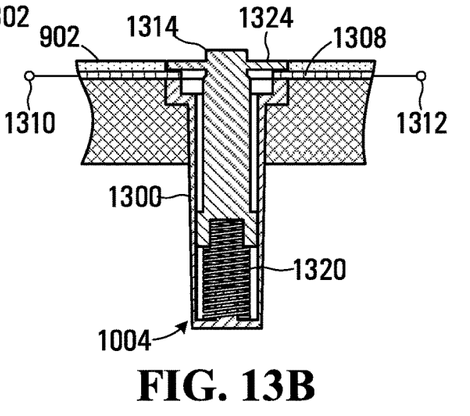
FIG. 13B is a cross-sectional view of the alternative embodiment of a pin assembly shown in FIG. 13A in a retracted position.

Referring to FIG. 13B, the pin 1314 is shown depressed into the retracted position due to a force exerted by an article (not shown) received on the support surface 1302 above the pin. The conductive flange 1324 engages both portions of the conductive circuit layer 1308 connecting the terminal 1310 to the terminal 1312 and acting as an electrical switch responsive to the pin 1314 being in the retracted position. When the apparatus 900 is implemented using the cylindrical insert 1300 and conductive circuit layer 1308 as shown in FIGS. 13A and 13B, the conductive circuit layer may be laid out such that each one of the plurality of pins on the support surface have an associated sensor responsive to the position of the pin. As described above in connection with FIG. 12, a processor circuit may be connected to receive and process inputs from the conductive circuit layer 1308 associated with each pin as described above in connection with FIG. 12.

Referring back to FIG. 1, the support surface 102 of the apparatus 100 shown in FIG. 1 is shown supporting a single article 104. However the support surface 102 is sufficiently large to support several articles of the size shown for the article 104. Similarly the apparatus 600 shown in FIG. 6 and the apparatus 900 shown in FIG. 9 may also support a plurality of articles spaced apart on the respective support surfaces for transport. While the support surfaces of the apparatus 100, 600, and 900 are shown as being generally circular, the support surface may be otherwise shaped and sized depending on the number and shape of the articles to be supported. In the other embodiments the support surface 102 may be sized to support a single article 106.

Figure 14:
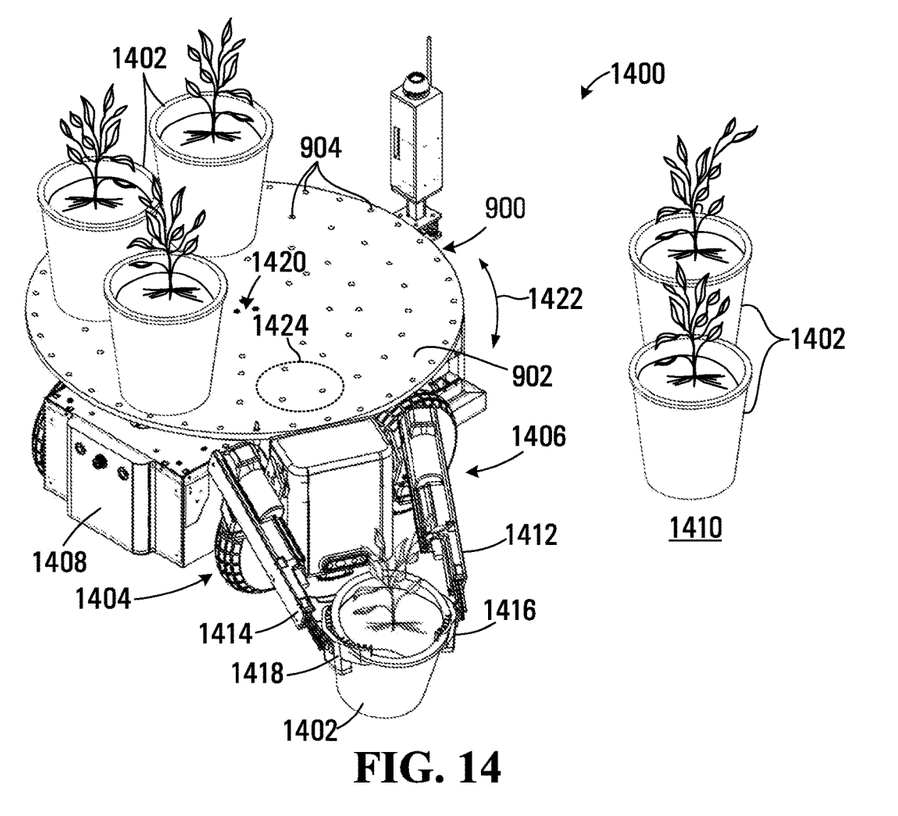
FIG. 14 is a perspective view of the apparatus shown in FIG. 9 mounted on a robotic vehicle.

Referring to FIG. 14, the apparatus 900 is shown mounted on a robotic vehicle 1400 operable to transport a plurality of articles, which in this case are plant pots 1402 being grown in a plant nursery. The robotic vehicle 1400 includes a wheeled chassis 1404 and a manipulator 1406. The robotic vehicle 1400 also includes a controller 1408 operable to control functions of the robotic vehicle. For example, the manipulator 1406 of the robotic vehicle 1400 is controlled by the controller 1408 to load pots 1402 onto the support surface 902 at a pickup location 1410. In the embodiment shown the manipulator 1406 has a pair of arms 1412 and 1414 terminating in end effectors 1416 and 1418 that grasp the pot 1402 and lift the pot onto the support surface 902. The apparatus 900 is mounted to the robotic vehicle 1400 at a central location on the support surface 902 and the robotic vehicle includes at least one rotation actuator (not shown) that is configured to cause successive relative rotational movements between the manipulator 1406 and the support surface 902 in a direction indicated by the arrow 1422. The successive rotational movements provide access for loading subsequent pots 1402 onto the support surface. In FIG. 11, three pots 1402 have already been loaded onto the support surface 902 and a vacant area 1424 has been aligned with the manipulator 1406 for loading another pot 1402 held in the pair of end effectors 1416 onto the support surface. Each pot 1402 is supported on the support surface 902 such that a portion of the plurality of pins 904 underlying the article are depressed into the retracted position and a portion of the plurality of pins remain in the extended position, as described above in connection with the apparatus 100. Lateral retaining portions of the respective pins are thus disposed adjacent to each pot 1402 and constrain the pots on the support surface during transport.

The robotic vehicle 1400 may alternatively have either the apparatus 600 or the apparatus 900 mounted as described above. Further details of and embodiments of a robotic vehicle similar to the robotic vehicle 1400 are described in a commonly owned PCT patent application PCT/CA2017/000057 filed on Mar. 10, 2017 and entitled "MOBILE WORK STATION FOR TRANSPORTING A PLURALITY OF ARTICLES", the contents of which are incorporated herein by reference in its entirety. As described in PCT/CA2017/000057, a controller (similar to the controller 1408) also controls movement of the robotic vehicle 1400 for navigating within the plant nursery from the pickup location 1410 to a drop-off location where the pots 1402 may be unloaded.

Either of the embodiments shown in FIG. 10 and FIG. 11 or FIGS. 13A and 13B may be implemented on the robotic vehicle 1400, such that the pins 904 are associated with sensors that produce signals indicative of the pin being in the extended or retracted position. When an article such as the pot 1402 is received on the support surface 902, pins 904 that are distributed over the support surface 902 under the article move from the extended position to the retracted position and the associated sensor produces a signal in response. The signals produced by the sensors may be interpreted by a processor circuit to determine at least the presence of the article on the support surface 902 and in some embodiments the location of the article on the support surface. The processor circuit may further determine other attributes of the article such as the size, orientation (for articles having non-circular or non-symmetrical shape), and/or weight of the article based on the signals provided by the sensors.

Figure 15:
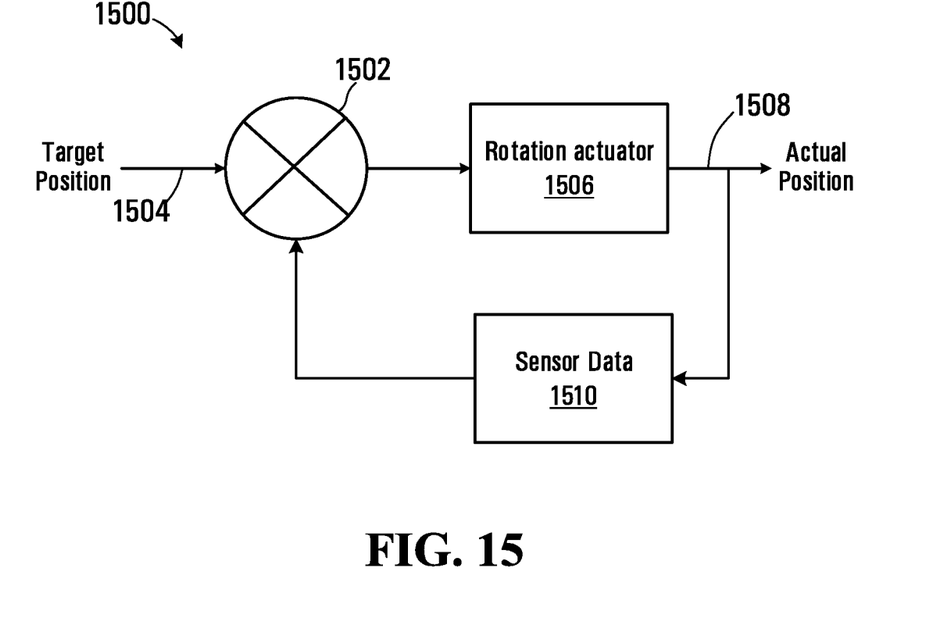
FIG. 15 is a schematic representation of a position control system implemented in a controller of the robotic vehicle shown in FIG. 14.

Referring to FIG. 15, a closed loop control system that may be implemented by the controller 1408 of the robotic vehicle 1400 is shown schematically at 1500. The controller functions are represented by the circular symbol 1502. In the example of the robotic vehicle 1400 shown in FIG. 14, the support apparatus 900 is controlled to use the manipulator 1406 to load pots 1402 placed on the support surface 902. The pots 1402 are to be radially arranged on the support surface 902 for transport and then unloaded at a destination by the manipulator 1406. For unloading, the robotic vehicle 1400 must first align a pot 1402 on the support surface 902 to the manipulator 1406 by rotating the support apparatus 900. A desired target position 1504 thus provides an input to the controller 1500 (which may be implemented by a processor circuit of the controller 1408 on the robotic vehicle 1400). The controller 1500 provides instruction data to a rotation actuator 1506, which is configured to cause rotation of the support surface w.r.t. the manipulator 1406 to an actual position 1508. The sensors associated with the pins 904 provide signals to the controller that can be interpreted to produce a measure of an error between the actual position 1508 and the target position 1504. The controller 610 may then further instruct the rotation actuator 1506 to cause a further rotation to correct the error and to position the support surface 902 at a new actual position 1508. This process may be repeated until the error is within a certain tolerance level. The controller 1500 implementing the closed loop positioning system accounts for and corrects errors or inaccuracies in rotation of the support surface 902. The implemented system has the advantage of the robotic vehicle 1400 being better able to react to external factors that may shift the position of articles being transported.

Figure 16:
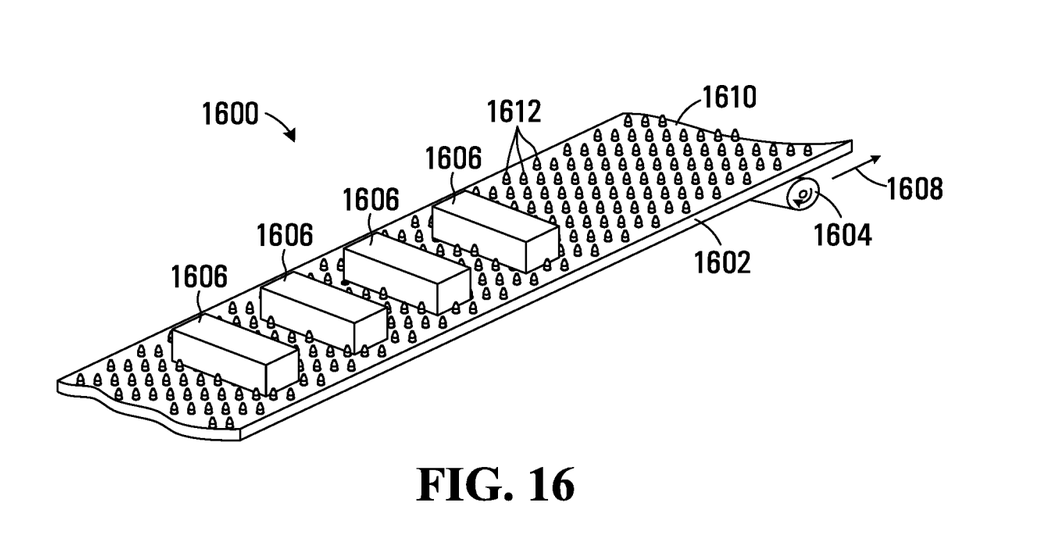
FIG. 16 is a perspective view of an alternative embodiment of a support surface.

Referring to FIG. 16, an alternative embodiment is shown generally at 1600. In this embodiment a conveyor belt 1602 coupled to a conveyor drive 1604 is operable to cause movement of the conveyor belt for transporting articles 1606 in a direction indicated by the arrow 1608. The conveyor belt 1602 has a support surface 1610 having a plurality of pins 1612 for retaining the articles 1606. As described above, the pins 1610 are each moveable between a retracted position and an extended position and laterally retain the articles 1606 during transport along the conveyor belt 1602. The plurality of pins 1612 may be implemented to include sensors as described above for monitoring and producing information related to the articles 1606 being transported, as generally described above.

While specific embodiments have been described and illustrated, such embodiments should be considered illustrative only and not as limiting the disclosed embodiments as construed in accordance with the accompanying claims.

What is claimed is:

1. An apparatus for supporting an article during transport, the apparatus comprising:
   a support surface oriented to support an underside of an article to be transported;
   a plurality of pins distributed over at least a portion of the support surface and movable between an extended position and a retracted position, the plurality of pins being urged into the extended position such that a lateral retaining portion of each pin protrudes above the support surface; and
   wherein each of the plurality of pins has a generally cylindrical shape and is slidingly received within an opening in the support surface;
   wherein each pin has a distal end disposed below the support surface, the distal end having a flange for engaging an underside of the support surface and retaining the pin within the opening when in the extended position;
   further comprising a compliant membrane disposed below the support surface and wherein the distal end of each pin causes elastic deformation of the membrane, the elastic deformation being operable to urge the pin toward the extended position;

wherein the underside of the article, when received on the support surface, causes a portion of the plurality of pins underlying the article to be depressed into the retracted position while an extended plurality of pins remain in the extended position such that the lateral retaining portions of the extended plurality of pins disposed adjacent to the article constrain the article to prevent movement of the article on the support surface while being transported.

2. The apparatus of claim 1 wherein the extended plurality of pins adjacent to the article surround the article and the respective lateral retaining portions of the extended plurality of pins adjacent to the article are operable to retain the article to prevent movement of the article in a plurality of different directions.

3. The apparatus of claim 1 wherein the membrane is mounted in a transversely deformed condition to provide a pre-load force for urging the plurality of pins toward the extended position.

4. The apparatus of claim 3 wherein a portion of the distal end of the pin has one of a rounded shape, a conical shape, and a flat shape.

5. The apparatus of claim 1 wherein the support surface is partitioned into a plurality of modular pin assemblies adjacently arranged to provide the support surface, each pin assembly comprising:
  a support plate having openings for receiving a subset of the plurality of pins;
  a spacer frame operably configured to provide space for movement of the subset of the plurality of pins between the extended position and the retracted position; and
  a compliant membrane between the support plate and the spacer frame and below the respective distal ends of the subset of the plurality of pins, wherein the distal end of each pin causes elastic deformation of the membrane, the elastic deformation being operable to urge the pin toward the extended position.

6. The apparatus of claim 5 wherein the modular pin assemblies are attached to a base.

7. The apparatus of claim 6 wherein each pin assembly comprises a retaining magnet operably configured to secure the pin assembly to the base.

8. The apparatus of claim 5 wherein the modular pin assemblies have a one of a circular shape and a regular polygonal shape.

9. The apparatus of claim 1 further comprising a cylindrical insert disposed in each opening in the support surface and having a distal end extending below the support surface, the cylindrical insert comprising:
  a bore for slidingly receiving the pin; and
  a resilient element disposed between the distal end of the insert and the pin, the resilient element being operable to urge the pin toward the extended position.

10. The apparatus of claim 9 wherein the resilient element comprises one of a spring, a compliant material, an elastomer, and a compressible fluid.

11. The apparatus of claim 9 wherein when the pin is in the retraced position the resilient element is operably configured to exert a force on each pin such that a total force exerted by the pins underlying the article is less than a weight of the article being supported.

12. The apparatus of claim 1 wherein the plurality of pins are regularly distributed over a portion of the support surface intended to support the article.

13. The apparatus of claim 1 wherein the support surface is sized to support a plurality of articles spaced apart on the support surface, each article in the plurality of articles having a portion of the plurality of pins underlying the article depressed into the retracted position, the lateral retaining portions of the extended plurality of pins disposed adjacent to the each article being operable to constrain the plurality of articles on the support surface.

14. The apparatus of claim 1 wherein the support surface is mounted on a robotic vehicle operable to transport the at least one article.

15. The apparatus of claim 14 further comprising a manipulator operably configured to load the plurality of articles onto the support surface.

16. The apparatus of claim 15 wherein the support surface is rotatably mounted on the vehicle and further comprising at least one actuator operably configured to cause successive relative rotational movements between the manipulator and the support surface to provide access for loading subsequent articles in the plurality of articles onto the support surface.

17. The apparatus of claim 15 wherein the plurality of articles comprise a plurality of plant pots and the apparatus is used to transport the plant pots within a plant nursery.

18. The apparatus of claim 17 further comprising a controller operable to control loading of articles onto the support surface at a pickup location within the plant nursery, control movement of the vehicle for navigating within the plant nursery, and to control unloading of articles from the support surface at a drop-off location within the plant nursery.

19. The apparatus of claim 1 wherein the support surface comprises a conveyor belt coupled to a conveyor drive, the conveyor drive being operable to cause movement of the conveyor belt to transport a plurality of articles.

20. The apparatus of claim 1 further comprising a plurality of sensors, each sensor being associated with at least one pin in the plurality of pins and operably configured to generate a signal in response to the at least one pin moving between the extended and retracted positions.

21. The apparatus of claim 20 wherein each sensor is associated with a subset of adjacently located pins in the plurality of pins and wherein the signal is generated by the sensor in response to movement of any of the pins in the subset of pins.

22. The apparatus of claim 20 further comprising a controller operably configured to process the signals from the plurality of sensors to determine at least one of:
  a presence of the article received on the support surface;
  a location of the article received on the support surface;
  a weight of the article received on the support surface; and
  an orientation of the article received on the support surface.

23. The apparatus of claim 20 wherein the sensor comprises one of:
  an electrical contact disposed to be contacted by a conductive portion associated with movement of the pin between the extended position and the retracted position; and
  a force sensing element operably configured to generate the signal in response to a force being applied by the pin moving between the extended and retracted positions.

24. The apparatus of claim 20 wherein each sensor in the plurality of sensors is connected via a circuit layer underlying the support surface to a controller, the controller being operably configured to process the respective signals.

25. The apparatus of claim 24 wherein the controller comprises a processor circuit operable to process the signals and an interface operably configured to transmit data representing the processed signals to a host controller.

26. A method for transporting an article, the method comprising:

causing a plurality of pins distributed over at least a portion of a support surface and movable between an extended position and a retracted position to be urged into the extended position by a compliant membrane disposed below the support surface, the distal end of each pin causing elastic deformation of the membrane, the elastic deformation being operable to urge the pin toward the extended position such that a lateral retaining portion of each pin protrudes above the support surface prior to receiving the article on the support surface, each of the plurality of pins having a generally cylindrical shape and being slidingly received within an opening in the support surface, each pin having a distal end disposed below the support surface, the distal end having a flange for engaging an underside of the support surface and retaining the pin within the opening when in the extended position; and receiving the article such that an underside of the article is supported on the support surface, the underside of the article causing a first portion of the plurality of pins underlying the article to be depressed into the retracted position while an extended plurality of pins remain in the extended position such that the lateral retaining portions of the extended plurality of pins disposed adjacent to the article constrain the article to prevent movement of the article on the support surface while being transported.

\* \* \* \* \*